L. W. CHUBB.
ELECTRICAL MEASURING INSTRUMENT.
APPLICATION FILED JULY 3, 1916.
1,376,399.
Patented May 3, 1921.
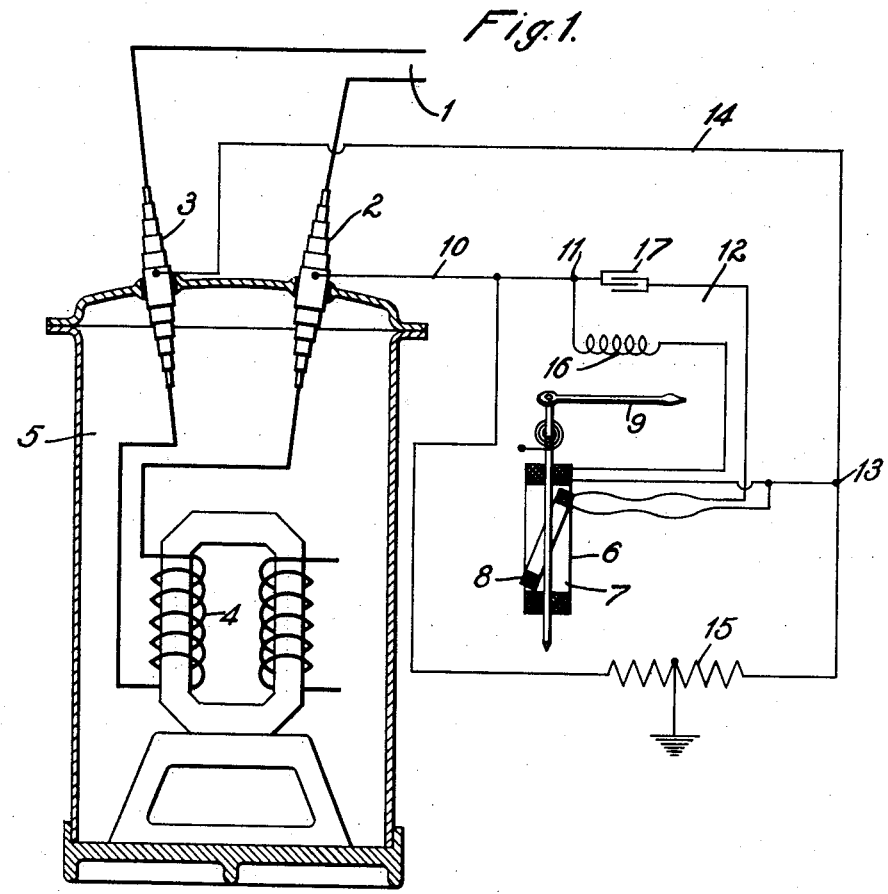
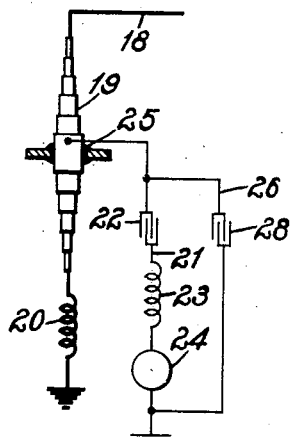
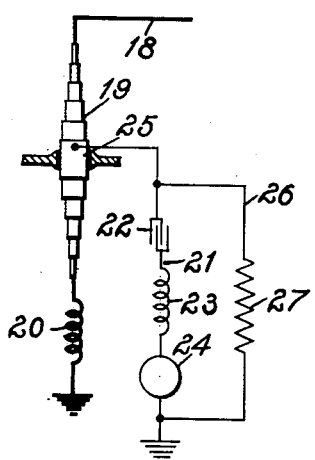
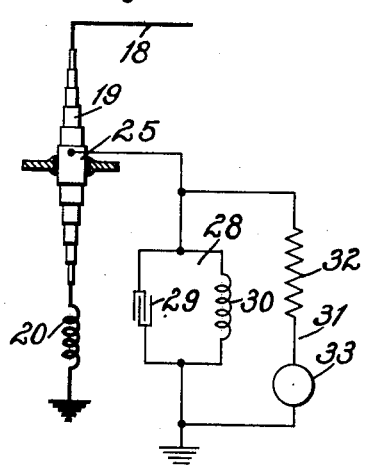
WITNESSES:
R. J. Fitzgerald
J. A. Procter
INVENTOR
Lewis W. Chubb.
BY
Wesley G. Carr
ATTORNEY

UNITED STATES PATENT OFFICE.

LEWIS W. CHUBB, OF PITTSBURGH, PENNSYLVANIA, ASSIGNOR TO WESTINGHOUSE ELECTRIC AND MANUFACTURING COMPANY, A CORPORATION OF PENNSYLVANIA.

ELECTRICAL MEASURING INSTRUMENT.

1,376,399. Specification of Letters Patent. Patented May 3, 1921.

Application filed July 3, 1916. Serial No. 107,257.

*To all whom it may concern:*

Be it known that I, LEWIS W. CHUBB, a citizen of the United States, and a resident of Pittsburgh, in the county of Allegheny and State of Pennsylvania, have invented a new and useful Improvement in Electrical Measuring Instruments, of which the following is a specification.

My invention relates to electrical measuring systems and instruments and particularly to means for measuring the root-mean-square value of the voltage impressed on a circuit by measuring the current that traverses one or more series-connected condensers which are connected across the circuit.

One object of my invention is to provide a system of the above indicated character that shall be adapted to measure the root-mean-square value of the voltage wave, irrespective of its distortion.

Another object of my invention is to provide a system of the above indicated character that shall be inexpensive to construct, simple to connect and accurate in operation.

Heretofore, it has been the practice to connect a plurality of series-connected condensers across a circuit and to measure the potential of one or more of the condensers by the use of an electrostatic voltmeter. Such a series of condensers constitutes an electrostatic auto-transformer of relatively poor regulation that is accurate only when utilized with an electrostatic voltmeter.

The root-mean-square value of the charging current of a condenser is the differential of the periodic voltage impressed across its terminals. If $E_1$, $E_3$, $E_5$, $E_7$ and $E_n$ are the root-mean-square values of the several harmonic components of a voltage wave, its root-mean-square value is E where (1) $\quad E = \sqrt{E_1^2 + E_3^2 + E_5^2 + E_7^2 + \ldots E_n^2}.$ If the voltage E is impressed across the terminals of a condenser, it will cause the condenser to have a root-mean-square value of charging current I where (2) $\quad I = Ca\sqrt{E_1^2 + (3E_3)^2 + (5E_5)^2 + (7E_7)^2 + \ldots (nE_n)^2}$ In equation (2) C = capacitance of the condenser in farads and $a = 2\pi$ times the fundamental frequency. It is evident from equations 1 and 2 that, with varying and unknown proportions of harmonic voltage components, the root-mean-square value of the charging current of the condensers is no indication of the root-mean-square value of the voltage, except with a sine wave, in which case $E_3$, $E_5$, etc., are zero, $E=E_1$, and I is proportional to E. In other words, if the voltage wave is distorted, the current will be relatively greater than the current produced by a sine wave of voltage because of the exaggeration of the harmonic components of the current, and, theoretically, in order to obtain a measure of the true root-mean-square value of the voltage, it is necessary to divide the high-frequency components of the charging current of the condenser by their harmonic order and measure the root-mean-square value of the resultants.

In the usual commercial circuits, the distorting harmonics affect the root-mean-square value of the voltage wave very little. Therefore, the root-mean-square value of the fundamental component is nearly equal to the root-mean-square value of the voltage wave. Hence, the fundamental component of the condenser current alone would be a practical indication of the root-mean-square value of the voltage.

In view of the above, I provide a shunted resonant circuit and a measuring instrument, and I operatively connect the same in series with the condenser the voltage across which is to be determined. The resonant circuit is so tuned and proportioned that current proportional to the voltage to be determined traverses the measuring instrument. Thus, a sufficiently practical indication of the root-mean-square value of a distorted voltage wave may be obtained.

In the accompanying drawing, Figure 1 is a diagrammatic view of an electrical system embodying my invention, and Figs. 2, 3 and 4 are diagrammatic views of modified forms of measuring systems embodying my invention.

In Fig. 1 of the drawing, a high-tension electrical circuit 1 is operatively connected, through condenser terminal bushings 2 and 3, to a primary winding 4 of a transformer 5. An electrical measuring instrument 6 is provided for the purpose of measuring the root-mean-square value of the voltage impressed across the circuit 1, and comprises, in general, a stationary winding 7, a movable winding 8 and a pointer 9.

A conductor 10 is connected from the outside layer of the condenser terminal bushing 2 to one terminal 11 of a parallel resonant circuit 12, the other terminal 13 of which is connected to a conductor 14 that is connected to the outside layer of the condenser terminal bushing 3. A resistor 15 is connected in shunt relation to the resonant circuit 12, thus constituted; the winding 7 of the instrument 6 is connected in series with the reactive element 16 of the resonant circuit 12, and the winding 8 is connected in series with the condensive element 17 of the resonant circuit 12.

The current through the resistor 15 is proportional to the voltage impressed across the parallel resonant circuit 12. However, the current in the conductors 10 and 14 is proportional to the differential value of the line voltage at constant frequency and capacitance of the condenser terminal bushings 2 and 3. Thus, the current that circulates in the parallel resonant circuit 12 is proportional to the voltage drop across the conductors 10 and 14. The resonant circuit 12 is so tuned that the fundamental current cannot pass through the same, but a circulating current, dependent upon the fundamental component of the drop in potential across the resistor 15, will cause current to traverse the windings 7 and 8 in proportion to the fundamental component of the voltage that is impressed across the circuit 1. The current in the winding 7 will be 180° out of phase with the current traversing the winding 8. The windings 7 and 8 are so connected that the pointer 9 will indicate the value of the current traversing these windings which is proportional to the root-mean-square value of the voltage that is impressed across the circuit 1, or, for constant frequency circuits, the meter scale (not shown) that coöperates with the pointer 9 may be calibrated to read directly in root-mean-square values of the voltage that is impressed across the circuit 1.

The harmonic components of the condenser current will divide and flow through the two branches of the resonant circuit 12 and the resistor 15 in such manner that the torque produced in the meter will be substantially equal to that which would be produced by the integral value of the condenser current, assuming that the current passes through the two meter windings.

If, for example, the resistance of the resistor 15 is equal to the reactance of the reactive element 16, at fundamental frequency, it can be shown that the division of each harmonic current in the three parallel circuits will be such as to give a meter torque proportional to $\frac{n^2}{(n^2-1)^2+n^2}$ while the theoretical torque should be proportional to $\frac{1}{n^2}$, where "$n$" is the order of the harmonic current.

As already stated, the harmonic components could be entirely neglected without appreciable error, but, with the device shown in Fig. 1, the inclusion of the harmonic torques reduces the errors to the second order and to a small part of one per cent. on very distorted waves.

In Figs. 2 and 3 of the drawing, one conductor of a grounded high-potential circuit 18 is connected through a condenser terminal bushing 19 to a primary winding 20 of the transformer. If it is desired to determine the root-mean-square value of the voltage across the high-potential circuit 18, a series resonant circuit 21 is provided that comprises a condenser 22, a reactor 23 and a measuring instrument 24, such as a voltmeter or ammeter. The circuit 21, which is connected between the outer layer 25 of the condenser terminal bushing 19 and the ground, is so tuned that substantially only the fundamental component of the current will traverse the instrument 24. A circuit 26, comprising either a resistor 27 or a condenser 28, is connected in shunt relation to the series resonant circuit 21 for the purpose of permitting the harmonic currents to be shunted from the instrument 24.

In Fig. 4 of the drawing, a parallel resonant circuit 28 is connected between the outer layer 25 of the condenser terminal bushing 19 and the ground, and the condensive element 29 and the reactive element 30 of the parallel resonant circuit 28 are so proportioned that only the harmonic components of the current traverses the same. A circuit 31 is connected in shunt relation to the resonant circuit 28 and comprises a resistor 32 and an electrical measuring instrument 33. Thus, the circuit 31 is traversed substantially by only the fundamental component of the current, and the measuring instrument 33 will indicate the root-mean-square value of the voltage impressed across the circuit 18.

I do not limit my invention to the particular systems illustrated, as many modifications may be made therein without departing from the spirit and scope of the invention as set forth in the appended claims.

I claim as my invention:

1. A measuring system comprising a condenser, a resonant circuit and a non-resonant circuit operatively connected in shunt with respect to each other and in series with the condenser, and a measuring instrument, said measuring instrument being connected in series with at least one of the said circuits as to be supplied with current that is substantially proportional to the fundamental component of the voltage impressed across the said condenser.

2. The combination with a condenser across which is impressed a voltage that is to be measured, of a resonant circuit and a non-resonant circuit operatively connected in shunt with respect to each other and in series with the condenser, and an electro-responsive means so connected to the said circuits that it is supplied with energy substantially in accordance with the voltage to be measured.

3. The combination with a condenser across which is impressed a voltage that is to be measured, of a resonant circuit and a non-resonant circuit operatively connected in shunt with respect to each other and in series with the condenser, and an electro-responsive means connected in series with one of the said circuits whereby it is supplied with energy in accordance with the fundamental component increased by a relatively small portion of the harmonic component of the voltage to be measured.

4. In a measuring system, the combination with a condenser the potential drop across which is to be determined, of a measuring instrument, and resonant means connected in series with the said instrument and in series with the said condenser whereby the instrument is supplied with energy substantially in accordance with the fundamental component of the potential drop across the condenser only.

5. In a measuring system, the combination with a condenser, of an electro-responsive device, and resonant means connected in series with the condenser and the electro-responsive device whereby the electro-responsive device is supplied with current from the condenser substantially in accordance with the fundamental component only of the potential drop across the condenser.

6. In a measuring system, the combination with a condenser, of an electro-responsive device, and a resonant circuit operatively connected in series with the condenser and comprising the winding of the electro-responsive device, said resonant circuit being so tuned that only current which varies substantially in accordance with the fundamental component of the voltage impressed across the condenser traverses the winding of the device.

7. In an electric circuit, the combination with a condenser, of a measuring instrument, and a resonant circuit connected in series with the condenser and comprising the winding of the instrument, said resonant circuit being so tuned that current substantially proportional to the fundamental component only of the current traversing the electric circuit traverses the winding of the instrument.

8. In an electric circuit, the combination with a condenser operatively connected in the circuit, of an electro-dynamometer, a parallel-resonant circuit operatively connected in series with the condenser and comprising the windings of the electro-dynamometer, said resonant circuit being tuned to prevent the fundamental component of the current traversing the electric circuit from traversing the said windings, and means connected in shunt relation to the resonant circuit having a voltage impressed thereon substantially proportional to the fundamental component of the potential of the electric circuit.

9. A voltage-measuring system for a distorted potential wave comprising a condenser across which the potential to be measured is impressed, a measuring instrument, and resonant means connected in series with the instrument and the condenser whereby the instrument will indicate substantially the root-mean-square value of the voltage to be measured, irrespective of the high-frequency components of the voltage to be measured.

10. A measuring system comprising a condenser, a resonant circuit and a non-resonant circuit operatively connected in shunt to each other and in series with the condenser, and a measuring instrument, said measuring instrument being so connected to both of the said circuits as to be supplied with current that is substantially proportional to the voltage impressed across the said condenser.

In testimony whereof, I have hereunto subscribed my name this 30th day of June, 1916.

LEWIS W. CHUBB.